Feb. 21, 1939.  T. A. McDONALD, JR., ET AL  2,147,852
GRAIN SLICING MACHINE
Filed May 23, 1936   2 Sheets-Sheet 1

Inventors
Thomas A. McDonald, Jr.
Thomas G. Knight
By Arthur H. Sturges
Attorney Feb. 21, 1939. T. A. McDONALD, JR., ET AL 2,147,852
GRAIN SLICING MACHINE
Filed May 23, 1936   2 Sheets-Sheet 2

Inventor
Thomas A. McDonald, Jr.
By Thomas G. Knight
Arthur H. Sturges  Attorney Patented Feb. 21, 1939

2,147,852

UNITED STATES PATENT OFFICE 2,147,852

GRAIN SLICING MACHINE

Thomas A. McDonald, Jr., and Thomas G. Knight, Omaha, Nebr.

Application May 23, 1936, Serial No. 81,493

2 Claims. (Cl. 83—6)

This invention relates to slicing machinery particularly adapted for use in the preparation of foodstuffs and more particularly breakfast cereals prepared from small grains.

It is an object of the invention to provide means for shaving thin slices from grains of wheat which shavings can be used rapidly, economically and efficiently for breakfast food purposes.

A further object of the invention is to provide means for shaving slices longitudinally of kernels of wheat whereby said slices are of uniform thinness.

Other and further objects and advantages of the invention will be understood from the following detailed description thereof, reference being had to the accompanying drawings in which.

Figure 1:
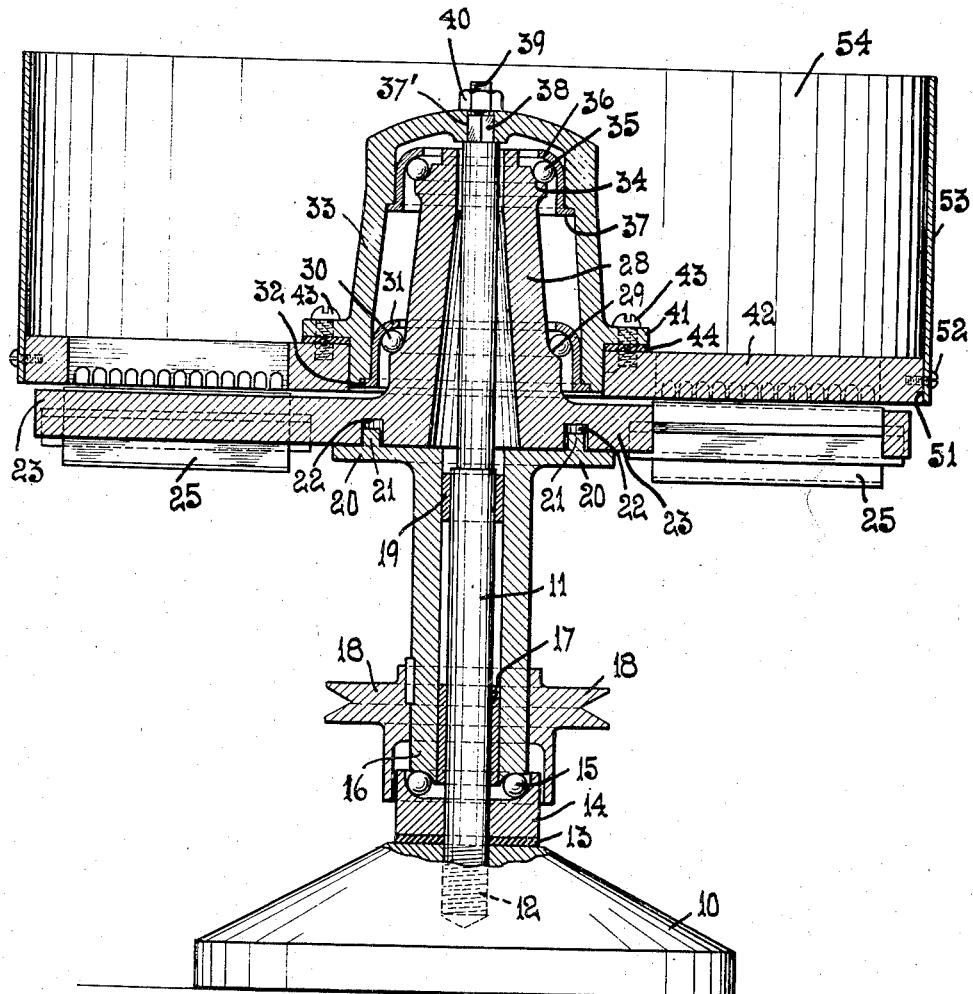
Figure 1 is a vertical section of a grain shaving machine embodying the present invention.

Referring now to the drawings for a more particular description and first to Figure 1, 10 indicates a stationary base which may be secured if desired to a floor. A vertically disposed standard or axle 11 is secured to the base 10 by any suitable means such as the screw threads 12.

About the axle 12 and on top of the base a washer 13 is provided and resting thereon is a ball-race 14 having anti-friction balls 15 which are annularly disposed about the axle 11 and support an elongated sleeve 16 having a bearing 17 and a pulley 18, the latter being keyed to said sleeve. An upper bearing 19 is provided within the sleeve about the axle. The upper end of the sleeve is provided with an annular flange 20 having standing studs 21 which are received within the recesses 22 of a knife plate 23 whereby said plate is removably secured to the sleeve 16.

Figure 3:
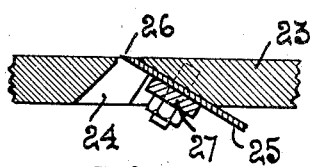
Figure 3 is a sectional view of a portion of a knife plate and an adjustable knife employed, the view being taken on line 3—3 of Figure 4.
Figure 4:
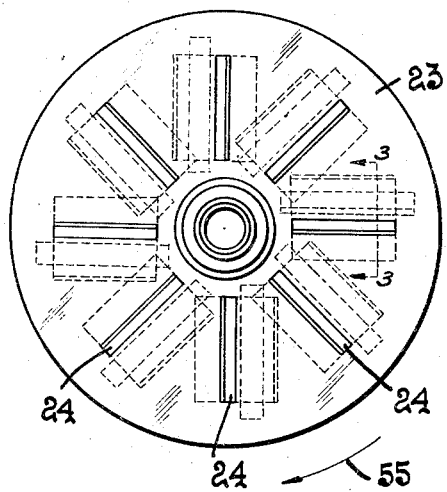
Figure 4 is a top plan view of the knife plate.

As best shown in Figure 4, the plate 23 is provided with a plurality of radially disposed, equidistantly spaced apart elongated apertures 24, through which, as best shown in Figure 3, cutting knives 25 extend, the latter having sharp slicing edges 26 and being removably secured by means of stud bolt, nut and washer assembly 27, whereby the knives are removable for sharpening purposes and also are adjustable for positioning their cutting edges 26 projecting beyond the upper plate surface of the plate 23 a preselected distance sufficient for regulating the thickness or thinness of a slice removed from a wheat kernel when the latter is pressed toward the knives as later described.

The revoluble knife plate is formed preferably integral with a hub 28 and substantially midway between the ends of the hub is provided a shoulder 29 for supporting an annularly disposed series of anti-friction steel roller balls 30, the latter carrying a thrust collar 31. The member 31 is annularly disposed with respect to the hub 28 and is provided with a horizontally extending flange 32 which supports an elongated cap 33.

The upper end of the hub 28 is provided with a ball-race 34 which cooperates with the upper series of anti-friction balls 35 in supporting an upper thrust bearing 36, the latter similarly being provided with an annularly and horizontally disposed flange 37 which carries the upper portion of the cap 33.

The crown of the cap 33 is provided with an aperture 37' which is of angular contour in plan, said aperture receiving the correspondingly shaped pintle end 38 of the axle 11, said pintle end projecting through the crown of the cap and being provided with screw thread 39 for the reception of a nut or keeper 40 whereby the cap 33 is maintained stationary by means of the rectangular contour in plan of the member 38.

The cap 33 is provided with an annularly disposed flange 41 which supports a vise plate 42 by means of bolts or keepers 43. Between the flange 41 and the upper surface of the disc 42 a removable washer 44 is positioned and it will be understood that thicker or thinner washers may be selectively substituted for the washer 44 for adjusting the mechanism to shave thinner or thicker slices from kernels of wheat as may be preselected and desired by the operator. The arrangement of parts being such that the lower plane surface of the vise plate is maintained in parallelism with and adjacent to the upper plane surface of the knife plate with the cutting edges of the knives disposed between said surfaces.

Figure 5:
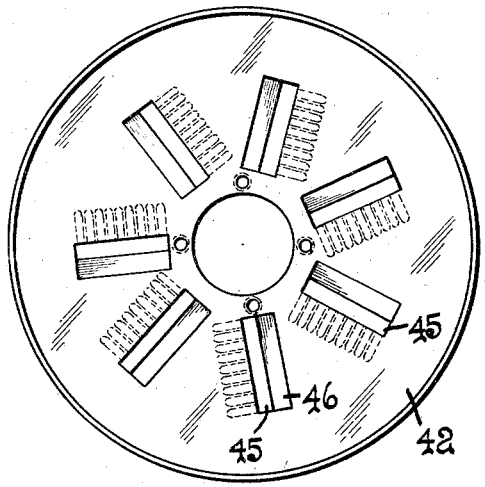
Figure 5 is a top plan view of the vise plate.

As best shown in Figure 5, the vise disc 42 is provided with a plurality of radially disposed elongated apertures 45, one of the longer side walls of which is inclined as indicated at 46 for purposes later described.

Figure 2:
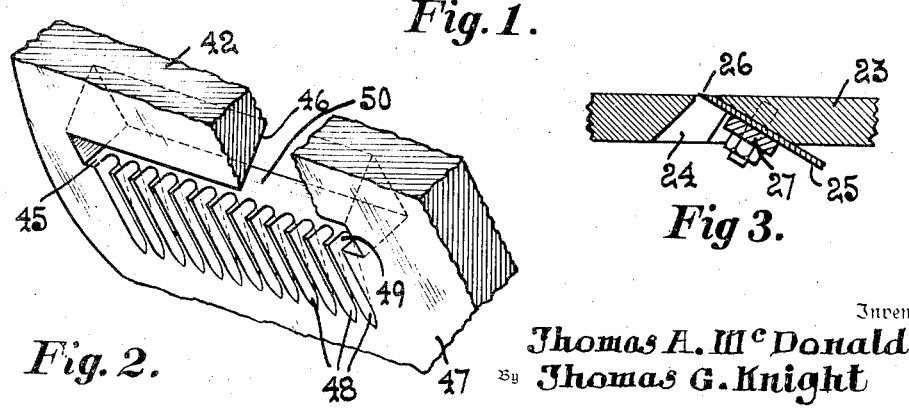
Figure 2 is a perspective, fragmentary view, partially in section, of a grain vise plate employed.

As best shown in Figure 2, the lower plane surface 47 of the vise plate 42 adjacent each aperture 45 thereof is provided with a plurality of elongated slots 48 having open ends 49 in alignment with the wall 50 of the aperture 45 which is oppositely disposed from the beveled wall 46 thereof, said wall 50 being preferably formed at a right angle with respect to the surface 47 of the vise plate 42, said ends 49 being in communcation with the apertures 45. The walls of the slots 48 taper or converge from their wider open ends 49 toward their restricted ends and terminate flush with the plane surface 47 of the vise plate and in alignment therewith for purposes later described.

About the perimeter 51 of the vise disc or member 42 and secured to the surface thereof by any suitable means such as the screws or keepers 52 an annularly disposed and upwardly projecting collar 53 is provided having an open top which cooperates with the upper surface of the vise disc 42 in providing a hopper or grain reservoir.

The pulley wheel 18 is provided with a belt, not shown, the latter being driven by and in communication with any suitable source of power such as a motor or the like.

In operation kernels of wheat or the like or material to be shaved or sliced is poured or placed into the hopper 54, said kernels being communicated to the apertures 45 as preceding kernels become sliced.

The knife disc is caused to revolve in the direction of the arrow 55 shown in Figure 4, whereby the cutting edges 26 of the knives 25 move past the vise slots of the vise disc from the wider open ends thereof toward the restricted ends thereof.

It will be understood that said open ends of the vise slots are slightly greater in area than a conventional sized kernel of wheat in diameter whereby said kernels become presented longitudinally to the cutting knives, the sides of the kernel abutting the side walls of a slot 48 and being slidable in a slot during the shaving operation.

In operation the weight of the vise plate 42 presses the kernels of wheat towards the cutting edges of the knives and as the latter revolve said edges shave off a slice from each kernel, said slices falling through the apertures 24 of the knife plate 23 and are gathered in suitable containers, not shown, placed under the device.

As each slice is cut from a kernel of wheat and as soon as the cutting blade passes said kernel the latter becomes moved or pushed rearwardly of the tapered slots 48 between the convergent walls thereof by the next subsequent knife stroke and resultant from the direction of travel of said blade toward the restricted end of a slot. The revoluble knives are applied to a kernel of wheat as soon as the latter lodges in a slot 48 and as each succeeding knife stroke or knife edge contacts a kernel a slice is cut therefrom, the contour and formation of said slots being such that a shaved kernel is pressed towards the knives as each slice is removed until each kernel is completely cut into thin slices.

Figure 6:
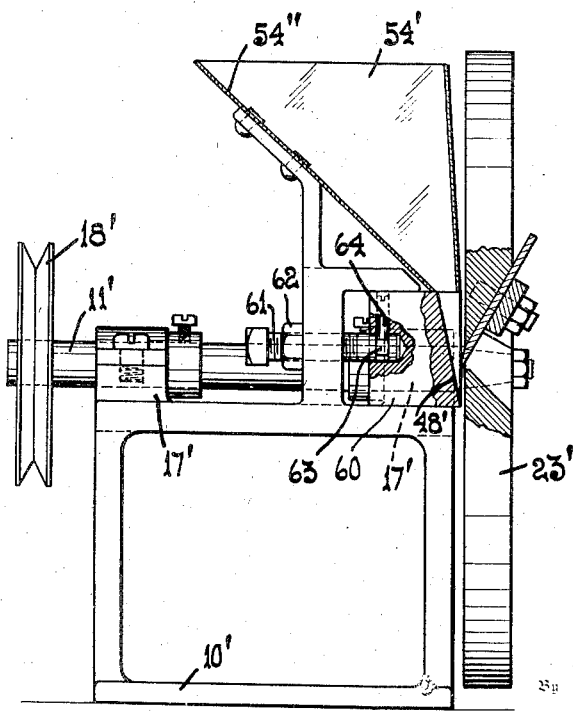
Figure 6 is a side elevation partly in vertical section of a modified form of the invention.

As best shown in Figure 2 the oppositely disposed walls of each vise slot at their juncture with the surface of the vise-plate converge toward each other at said restricted ends and preferably meet midway of the transverse width of each slot as shown in said figure providing a semi-oblate-spheroid shape in plan for the restricted ends of each slot, said shape being complementary to the form of an end portion of a kernel of wheat which, in conjunction with the tapering shape of the roof of each slot, provides a means for holding fractionated portions of wheat kernels in said vise-slots while said portions are successively shaved until the said portions are of a thickness substantially equal to the distance between the cutting edges of the knives and the adjacent surface of the vise plate, said tapering shape of the roof of said vise-slots being illustrated by dotted lines in Figure 2 and a full line in Figure 6.

Referring to the modification shown in Figure 6, the latter contains a base 10' and a horizontally disposed axle or shaft 11', pulley wheel 18', pillow or bearing blocks 17' disposed at each end of the shaft 11'; a hopper 54' having an inclined bottom 54'' and a revoluble knife disc 23' secured to the shaft 11.

Referring to the modified form of the invention shown in Figure 6 said modification also contains a plurality of tapered slots 48', the larger open ends of which are in communication with a hopper and the operation of the modification is the same as heretofore described, adjustment for governing the thickness of a slice is provided by means of the slots 48' being formed in a slidable block or member 60, the latter being positioned between suitable guides and said block is adjustable horizontally for regulating the thickness of a slice by means of a set screw 61 having a lock nut 62. The inner end of the set screw is provided with an annularly disposed groove 63 within which is received a pin 64 carried by the block 60 and it will be understood that the operator by adjusting the set screw 61 simultaneously may selectively regulate the distance that the slots 48' are disposed from the cutting edges of the knives for governing the thickness or thinness of a slice of material.

It will be understood that while we have specifically described shaving slices from kernels of wheat that the foregoing described mechanism is equally adapted to shave substantially any substance within its capacity including foodstuffs such as beans, rice and the like having an oblate-spheroid shape, it only being necessary to increase the transverse width of the vise-slots to accommodate said cereals.

What is claimed is:

1. In a machine for removing thin longitudinal slices from wheat and similar shaped grains, a horizontally disposed vise disc having a radially disposed elongated aperture and a plurality of parallel tapering grooves of U-shape in cross-section in its lower face having their larger end open and terminating in one long wall of said elongated aperture and communicating with said aperture, said grooves extending normal to said wall and being of a width to accommodate said grains in lengthwise position only, the opposite long wall of said elongated aperture being inclined downwardly towards the open ends of said grooves, means for supplying grains to said aperture, and means cooperating with said inclined wall of said aperture for forcing the grains into said grooves in interfitting wedging relation and for slicing off thin slices from the grain wedged in each groove.

2. A machine for removing thin slices from small grains comprising a base support, a vertically disposed shaft having an end secured to the support, a knife-plate having a sleeve extending toward said base and a hub upstanding therefrom, said knife-plate, sleeve and hub being axially disposed for revolvable movements about said shaft, a cap secured to the free end of the shaft, said cap having a wall annularly disposed about said hub, a vise-plate rigidly secured to said cap-wall, a collar perimetrically disposed with respect to said vise-plate and upstanding therefrom for providing a hopper between said vise-plate and cap-wall, means secured to the sleeve for imparting revoluble movements to the knife-plate in one direction, and bearing means surrounding said shaft, supported by said hub and engaging said cap for maintaining said plates in slightly spaced apart parallelism with respect to each other.

THOMAS A. McDONALD, Jr.
THOMAS G. KNIGHT.